United States Patent
Vanconcelos et al.

(10) Patent No.: US 12,003,695 B2
(45) Date of Patent: Jun. 4, 2024

(54) SELF-ORGANIZING ROLLING SHUTTER CAMERA ARRAYS FOR LOW-COST, ACCURATE VOLUMETRIC CAPTURE WORKFLOWS

(71) Applicant: Sony Group Corporation, Tokyo (JP)

(72) Inventors: Luis Vanconcelos, San Marcos, CA (US); Nikolaos Georgis, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 98 days.

(21) Appl. No.: 17/901,731

(22) Filed: Sep. 1, 2022

(65) Prior Publication Data

US 2024/0080432 A1    Mar. 7, 2024

(51) Int. Cl.
| | |
|---|---|
| *H04N 13/282* | (2018.01) |
| *G06V 10/44* | (2022.01) |
| *G06V 20/50* | (2022.01) |
| *H04N 23/63* | (2023.01) |

(52) U.S. Cl.
CPC ......... *H04N 13/282* (2018.05); *G06V 10/443* (2022.01); *G06V 20/50* (2022.01); *H04N 23/633* (2023.01)

(58) Field of Classification Search
CPC .. H04N 13/282; H04N 23/633; G06V 10/443; G06V 20/50
See application file for complete search history.

(56) References Cited

U.S. PATENT DOCUMENTS

| | | | | |
|---|---|---|---|---|
| 8,964,967 | B2 * | 2/2015 | Helsloot | H04M 9/082 |
| | | | | 379/406.14 |
| 2007/0030342 | A1 * | 2/2007 | Wilburn | H04N 25/531 |
| | | | | 348/47 |
| 2021/0037229 | A1 * | 2/2021 | Maykol Gomes Pinto | |
| | | | | G01S 17/89 |

FOREIGN PATENT DOCUMENTS

WO    WO-2020104423 A1 *    5/2020    ............. G01S 17/86

OTHER PUBLICATIONS

Cenek Albl et al; "R6P—Rolling Shutter Absolute Pose Problem"; 9 pages.
Subeesh Vasu et al.; "Occlusion-Aware Rolling Shutter Rectification of 3D Scenes"; 10 pages.

* cited by examiner

*Primary Examiner* — Frantz B Jean
(74) *Attorney, Agent, or Firm* — Trellis IP Law Group, PC

(57) ABSTRACT

An apparatus includes one or more processors and logic encoded in one or more non-transitory media for execution by the one or more processors and when executed operable to receive images from a set of cameras that are positioned in a plurality of levels around one or more objects, wherein the set of cameras are positioned at a same orientation and each image is captured by a rolling shutter and associated with a position and orientation of a corresponding camera from the set of cameras. The logic is further operable to, for each level of cameras generate a three-dimensional pointcloud based on the position and orientation of corresponding cameras and matched extracted features. The logic is further operable to merge the three-dimensional pointcloud for each level of the cameras to form a three-dimensional volumetric model of one or more objects.

20 Claims, 12 Drawing Sheets

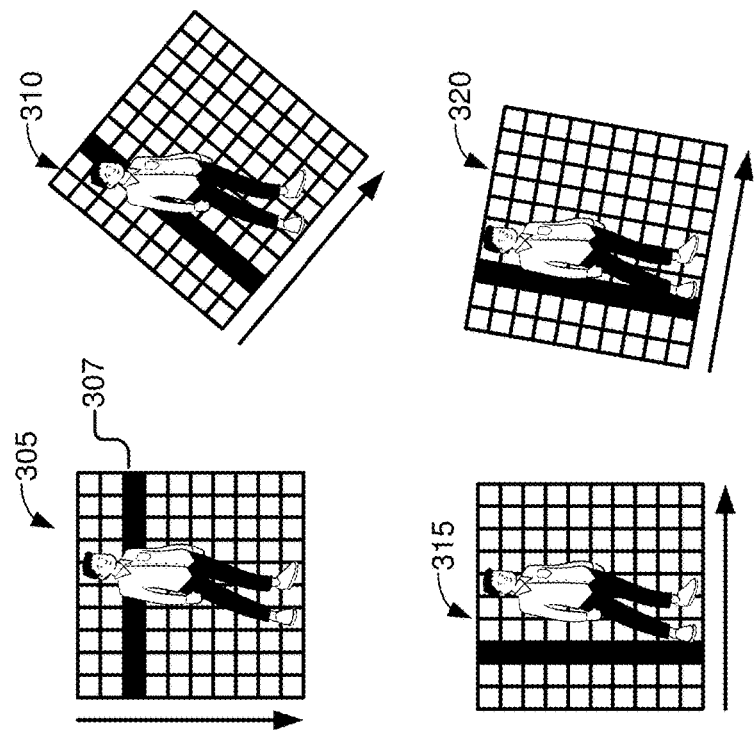
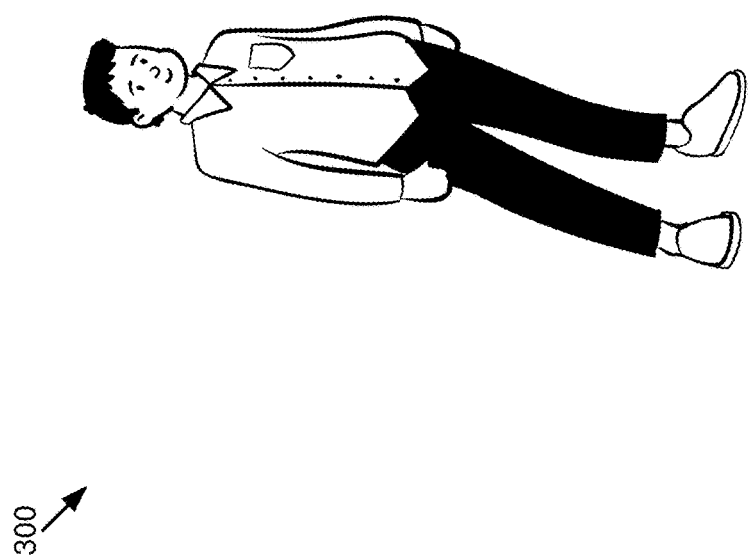
FIG 3

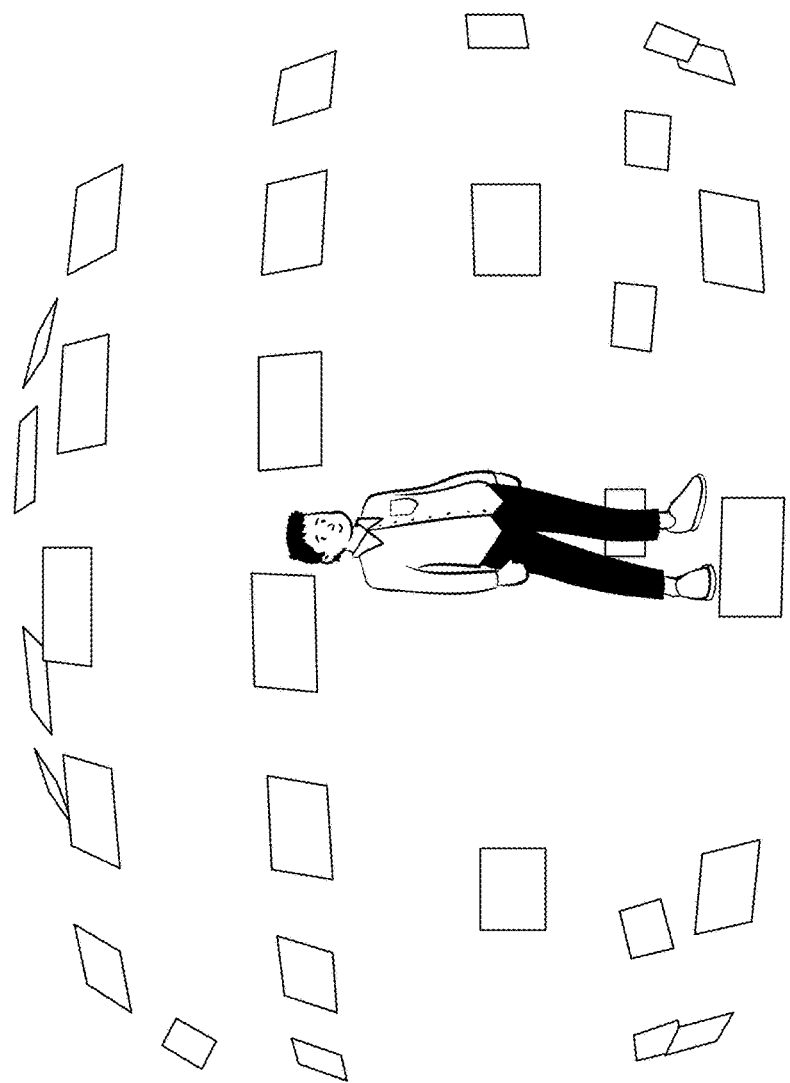
FIG 6

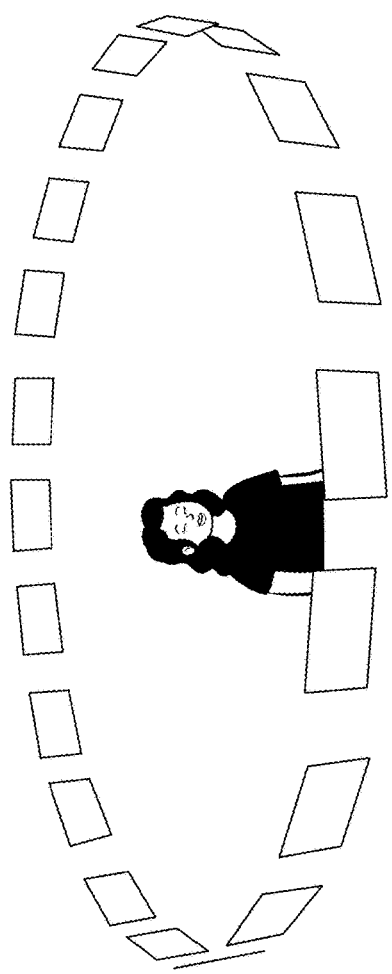
FIG 7

SELF-ORGANIZING ROLLING SHUTTER CAMERA ARRAYS FOR LOW-COST, ACCURATE VOLUMETRIC CAPTURE WORKFLOWS

BACKGROUND

Cameras may capture images using a global shutter or a rolling shutter. A global shutter in a camera captures an entire image of a scene at the same time. However, the hardware for capturing images with a global shutter is too expensive to use in conventional cameras. Instead, cameras that capture images with rollings shutter are more economically feasible.

A rolling shutter captures images by scanning lines across an image of a scene vertically or horizontally. As a result, 10-33 milliseconds may pass between the beginning of capture of the image to the end of capture of the image. This is not an issue when the scene includes static objects, but a problem arises when the scene includes an object in motion because different portions of the image will be captured at different times and a position of the moving object may have changed in the interim.

SUMMARY

A computer-implemented method includes one or more objects, wherein the set of cameras are positioned at a same orientation and each image is captured by a rolling shutter and associated with a position and orientation of a corresponding camera from the set of cameras. The method further includes, for each level of cameras: performing feature extraction on a subset of the images corresponding to the level to identify features of one or more objects, matching extracted features between the subset of the images, and generating a three-dimensional pointcloud based on the position and orientation of corresponding cameras and matched extracted features. The method further includes merging the three-dimensional pointcloud for each level of the cameras to form a three-dimensional volumetric model of one or more objects.

In some embodiments, the same orientation is a landscape orientation and each of the levels forms a cylinder around the one or more objects. In some embodiments, the same orientation is a portrait orientation and each of the levels forms a column. In some embodiments, one or more of the cameras in the set of cameras are part of a drone. In some embodiments, the method further includes determining that a camera in the set of cameras is not positioned or orientated to capture images that are colinear with the subset of the images corresponding to the level. In some embodiments, the method further includes generating graphical data for displaying a user interface that provides instructions for how to position a camera from the set of cameras. In some embodiments, the instructions are based on achieving a particular position and a particular orientation of the camera.

An apparatus includes one or more processors and logic encoded in one or more non-transitory media for execution by the one or more processors and when executed operable to receive images from a set of cameras that are positioned in a plurality of levels around one or more objects, wherein the set of cameras are positioned at a same orientation and each image is captured by a rolling shutter and associated with a position and orientation of a corresponding camera from the set of cameras. The logic is further operable to, for each level of cameras: perform feature extraction on a subset of the images corresponding to the level to identify features of one or more objects, match extracted features between the subset of the images, and generate a three-dimensional pointcloud based on the position and orientation of corresponding cameras and matched extracted features. The logic is further operable to merge the three-dimensional pointcloud for each level of the cameras to form a three-dimensional volumetric model of one or more objects.

In some embodiments, the same orientation is a landscape orientation and each of the levels forms a cylinder around the one or more objects. In some embodiments, the same orientation is a portrait orientation and each of the levels forms a column. In some embodiments, one or more of the cameras in the set of cameras are part of a drone. In some embodiments, the logic when executed is further operable to determine that a camera in the set of cameras is not positioned or orientated to capture images that are colinear with the subset of the images corresponding to the level. In some embodiments, the logic when executed is further operable to generate graphical data for displaying a user interface that provides instructions for how to position a camera from the set of cameras. In some embodiments, the instructions are based on achieving a particular position and a particular orientation of the camera.

Software encoded in one or more computer-readable media for execution by the one or more processors and when executed is operable to: receive images from a set of cameras that are positioned in a plurality of levels around one or more objects, wherein the set of cameras are positioned at a same orientation and each image is captured by a rolling shutter and associated with a position and orientation of a corresponding camera from the set of cameras. The one or more processors are further operable to, for each level of cameras: perform feature extraction on a subset of the images corresponding to the level to identify features of one or more objects, match extracted features between the subset of the images, and generate a three-dimensional pointcloud based on the position and orientation of corresponding cameras and matched extracted features. The one or more processors are further operable to merge the three-dimensional pointcloud for each level of the cameras to form a three-dimensional volumetric model of one or more objects.

In some embodiments, the same orientation is a landscape orientation and each of the levels forms a cylinder around the one or more objects. In some embodiments, the same orientation is a portrait orientation and each of the levels forms a column. In some embodiments, one or more of the cameras in the set of cameras are part of a drone. In some embodiments, the one or more processors are further operable to determine that a camera in the set of cameras is not positioned or orientated to capture images that are colinear with the subset of the images corresponding to the level. In some embodiments, the one or more processors are further operable to generate graphical data for displaying a user interface that provides instructions for how to position a camera from the set of cameras.

A further understanding of the nature and the advantages of particular embodiments disclosed herein may be realized by reference of the remaining portions of the specification and the attached drawings.

BRIEF DESCRIPTION OF THE DRAWINGS

FIG. 3 is a block diagram that illustrates a rolling shutter when the camera is at different angles according to some embodiments described herein.

FIG. 6 is a block diagram that illustrates a set of cameras that capture images of an object where the cameras are positioned in a landscape orientation according to some embodiments described herein.

FIG. 7 is a block diagram that illustrates a set of cameras that are positioned in a second layer in a landscape orientation according to some embodiments described herein.

DETAILED DESCRIPTION OF EMBODIMENTS

Example Environment 100

Figure 1:
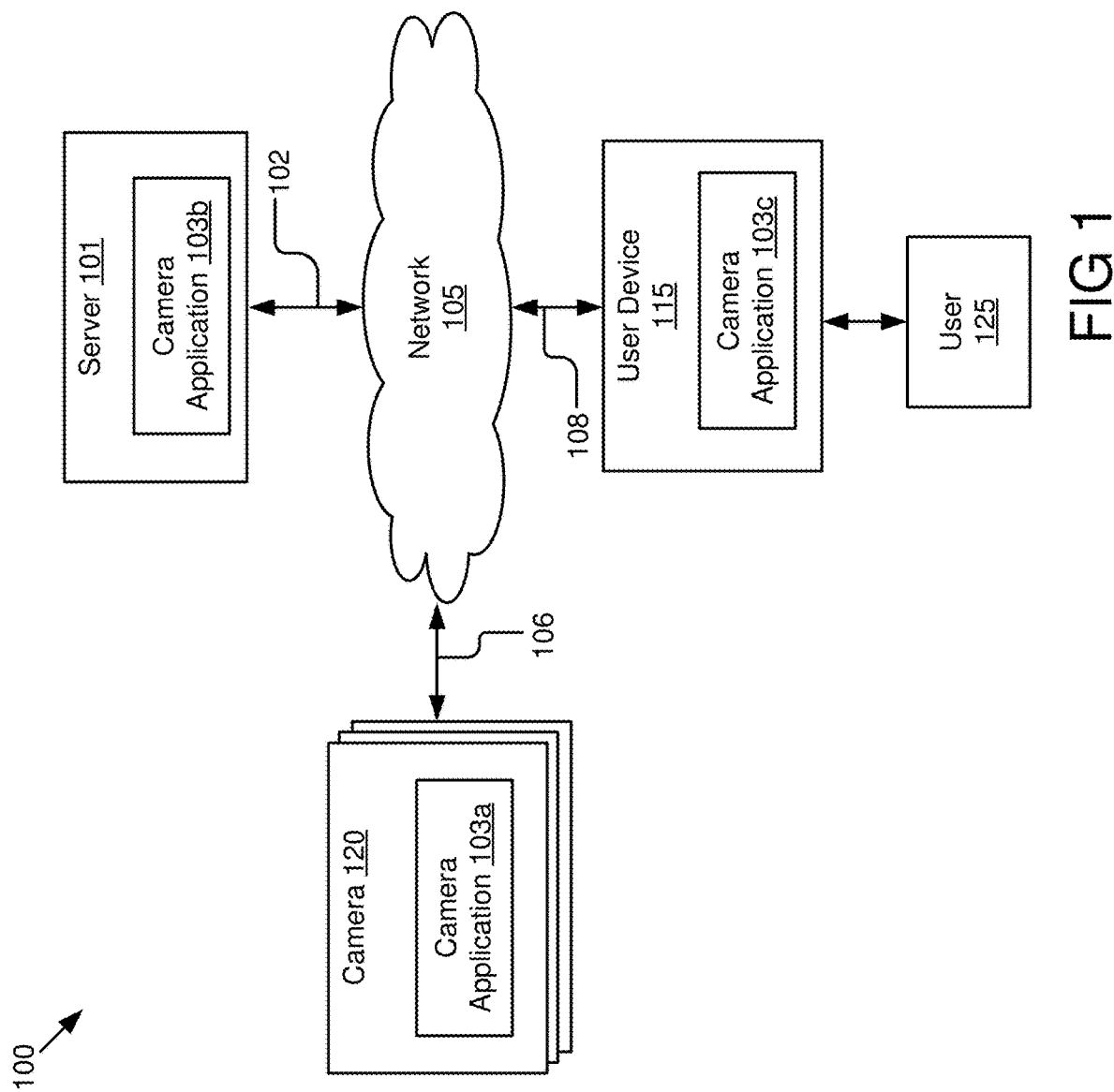
FIG. 1 is a block diagram of an example network environment according to some embodiments described herein.

FIG. 1 illustrates a block diagram of an example environment 100. In some embodiments, the environment 100 includes cameras 120, a server 101, and a user device 115. A user 125 may be associated with the user device 115. In some embodiments, the environment 100 may include other servers or devices not shown in FIG. 1. In FIG. 1 and the remaining figures, a letter after a reference number, e.g., "120a," represents a reference to the element having that particular reference number. A reference number in the text without a following letter, e.g., "120," represents a general reference to embodiments of the element bearing that reference number.

The camera 120 may include a processor, a memory, a camera application 103a, a display, any type of image capture device that can capture images and/or video, and network communication hardware. The camera 120 is communicatively coupled to the network 105 via signal line 106.

The camera 120 includes an optical sensor, which is also known as an image sensor. The optical sensor converts light waves into signals. The global shutter reads the data from the optical sensor by reading the optical sensor line by line. The camera 120 may include additional sensors, such as a gyroscope, for identifying a position and an orientation of the camera 120. When the camera 120 captures an image, the camera 120 generates metadata that includes the position and orientation of the camera 120. The camera 120 transmits the images and the metadata to the camera application 103.

In some embodiments, the camera 120 transmits a location and position of the camera 120 to the camera application 103 that is independent of the images.

In some embodiments, the cameras 120 are organized around an object. For example, the cameras 120 may be organized in multiple horizontal layers with the cameras 120 positioned in a landscape orientation or in multiple vertical layers with the cameras 120 positioned in a portrait orientation.

In some embodiments, the camera 120 is part of a drone. For example, the set of cameras 120 may be in a set of drones that are used to capture images of one or more objects, such as people playing a game, people in a performance, a building, etc.

In some embodiments, the camera application 103a includes code and routines operable to determine a position and an orientation of a camera 120a and transmit the information to the server 101 and/or the user device 115, which determines whether the cameras 120 are all at the same orientation and whether the position of each of the cameras is appropriate for capturing all aspects of the object. The camera application 103a may receive instructions from server 101 and/or the user device 115 for generating a user interface with instructions for moving the camera 120a so that the camera 120a captures images that are colinear with the images captured by the other cameras 120a. In some embodiments, as a user 125 changes the location of the camera 120a, the camera transmits the position and orientation information to the server 101 and/or the user device 115, receives new instructions, and displays an updated user interface.

In some embodiments where the camera 120 is part of a drone, the drone may receive instructions from the server 101 and/or the user device 115 for changing orientation and/or position for capturing all aspects of the object. The drone may automatically adjust based on the instructions.

The server 101 may include a processor, a memory, and network communication hardware. In some embodiments, the server 101 is a hardware server. The server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the server 101 sends and receives data to and from one or more of the camera 120 and the user device 115 via the network 105. The server 101 may include a camera application 103b.

In some embodiments, the camera application 103b includes code and routines operable to receive a position and orientation of each camera 120 and determine whether the cameras 120 are all at the same orientation. For example, the camera application 103b determines whether each camera is in a portrait orientation or a landscape orientation.

In some embodiments, the camera application 103b receives a position of the cameras, such as an angle as compared to a reference, such as the ground. The camera application 103b may determine whether any of the cameras need to be adjusted and send instructions to a user 125 to adjust any of the cameras that need to be adjusted. For example, the camera application 103b may generate a user interface that includes an illustration for rotating the camera 120, for changing the camera 120 from a landscape orientation to a portrait orientation, for changing a location of the camera 120 by moving it six inches, etc.

The camera application 103b may include code and routines operable to receive images from a set of cameras. For each level of cameras, the camera application 103b performs feature extraction on a subset of the images corresponding to the level to identify features of the object, matches extracted features between the subset of the images, and generates a three-dimensional (3D) pointcloud based on the position and orientation of the corresponding cameras 120. The camera application 103b merges the 3D pointcloud for each level of the cameras to form a 3D volumetric model of the object.

The user device 115 may be a computing device that includes a memory, a hardware processor, and a camera application 103c. The user device 115 may include a mobile device, a tablet computer, a laptop, a desktop computer, a mobile telephone, a wearable device, a head-mounted display, a mobile email device, or another electronic device capable of accessing a network 105 to communicate with one or more of the server 101 and the cameras 120.

In the illustrated implementation, user device 115 is coupled to the network 105 via signal line 108. Signal line 108 may be a wired connection, such as Ethernet, coaxial cable, fiber-optic cable, etc., or a wireless connection, such as Wi-Fi®, Bluetooth®, or other wireless technology. The user device 115 is used by way of example. While FIG. 1 illustrates one user device 115, the disclosure applies to a system architecture having one or more user devices 115.

In some embodiments, the camera application 103c stored on the user device 115 performs the steps mentioned above with reference to the camera application 103b stored on the server 101. In some embodiments, the camera application 103b receives instructions from the camera application 103b to generate a user interface that provides the user 125 with instructions on how to reposition one or more of the cameras 120.

Computing Device 200 Example

Figure 2:
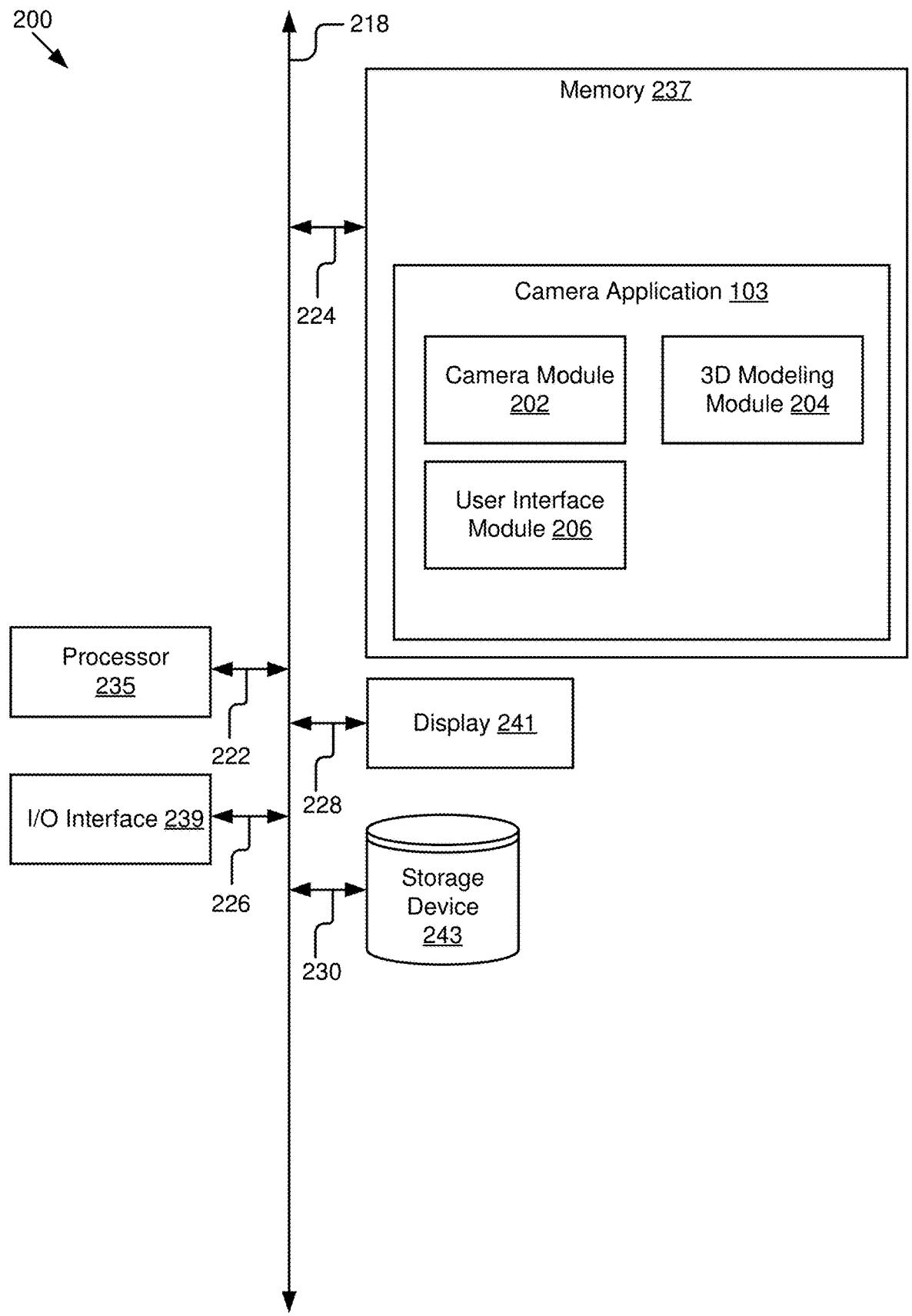
FIG. 2 is a block diagram of an example computing device according to some embodiments described herein.

FIG. 2 is a block diagram of an example computing device 200 that may be used to implement one or more features described herein. The computing device 200 can be any suitable computer system, server, or other electronic or hardware device. In one example, the computing device 200 is the user device 115 illustrated in FIG. 1. In another example, the computing device 200 is the server 101 illustrated in FIG. 1.

In some embodiments, computing device 200 includes a processor 235, a memory 237, an Input/Output (I/O) interface 239, a display 241, and a storage device 243. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, and the storage device 243 may be coupled to the bus 218 via signal line 230.

The processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems. A computer may be any processor in communication with a memory.

The memory 237 is typically provided in computing device 200 for access by the processor 235 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith. Memory 237 can store software operating on the computing device 200 by the processor 235, including the camera application 103.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., the memory 237 or the storage device 243), and input/output devices can communicate via I/O interface 239. In some embodiments, the I/O interface 239 can connect to interface devices such as input devices (keyboard, pointing device, touchscreen, microphone, sensors, etc.) and/or output devices (display devices, speaker devices, etc.).

Some examples of interfaced devices that can connect to I/O interface 239 can include a display 341 that can be used to display content, e.g., a graphical user interface (GUI), and to receive touch (or gesture) input from a user. Display 241 can include any suitable display device such as a liquid crystal display (LCD), light emitting diode (LED), or plasma display screen, cathode ray tube (CRT), television, monitor, touchscreen, 3D display screen, or other visual display device.

The storage device 243 stores data related to the camera application 103. For example, the storage device 243 may store data about each of the cameras 120 including the position and orientation information, images from each of the cameras, 3D volumetric models of objects, etc.

Example Camera Application 103

In some embodiments, the camera application 103 includes a camera module 202, a 3D modeling module 204, and a user interface module 206.

The camera module 202 processes data about the cameras 120. In some embodiments, the camera module 202 includes a set of instructions executable by the processor 235 to process the data about the cameras 120. In some embodiments, the camera module 202 is stored in the memory 237 of the computing device 200 and can be accessible and executable by the processor 235.

In some embodiments, the camera module 202 receives data about each of the cameras 120 in a set of cameras 120. The camera module 202 may receive the data as part of a setup process before images are transmitted or as part of metadata associated with images. If the data is received as metadata, the camera module 202 extracts the camera data from the metadata.

The camera module 202 determines one or more of a position, an angle, or an orientation of the cameras 120. The position refers to the location of the camera. The angle refers to direction of view and rotation of the camera 120. For example, the angle may include Euler angles called omega, phi, and kappa, which define the rotation of the camera from a default position. The orientation of the camera 120 may include a landscape orientation or a portrait orientation. The landscape orientation is also known as the horizontal orientation in which the long sides of the rectangle are at the top and the bottom. The portrait orientation is also known as the vertical orientation in which the short sides of the rectangle are at the top and the bottom.

Capturing images from cameras 120 that use rolling shutters results in artifacts in 3D models of the objects if the cameras 120 are not properly configured. The artifacts may include blurring or straight lines may appear curved and bent. Turning to FIG. 3, a block diagram 300 illustrates a rolling shutter when the camera 120 is at different angles. FIG. 3 includes four examples of rolling shutters.

The first example 305 includes a line 307 that represents the process of the rolling shutter as the rolling shutter moves from top to bottom while the camera 120 is in a portrait orientation. Different portions of the image are captured at different times. This can result in artifacts, especially when an object being captured by the image is in motion. In this first example 305, the image does not include artifacts because the lines capture symmetrical portions of the body at a substantially similar time. Specifically, the arms are captured at a substantially similar time so that any movement that occurs during the capture of the image will be reflected on both sides of the body.

The second example 310 represents the process of the rolling shutter as the rolling shutter moves from left to right while the camera 120 is in a landscape orientation and at an angle. As with the first example 305, the second example 310 does not result in artifacts because the portions of the boy are captured at a substantially similar time. For example, the shoulders are captured at a substantially similar time.

The third example 315 represents the process of the rolling shutter as the rolling shutter moves from left to right and the camera 120 is in a landscape orientation. The third example 315 may result in artifacts because, for example, the boy's right foot is captured before the boy's left foot and the left foot may move in the interim.

The fourth example 320 represents the process of the rolling shutter as the rolling shutter moves from left to right and the camera 120 is in a landscape orientation and at an angle. The fourth example 320 may result in artifacts because, for example, the boy's position may move while the image is being captured.

Figure 4:
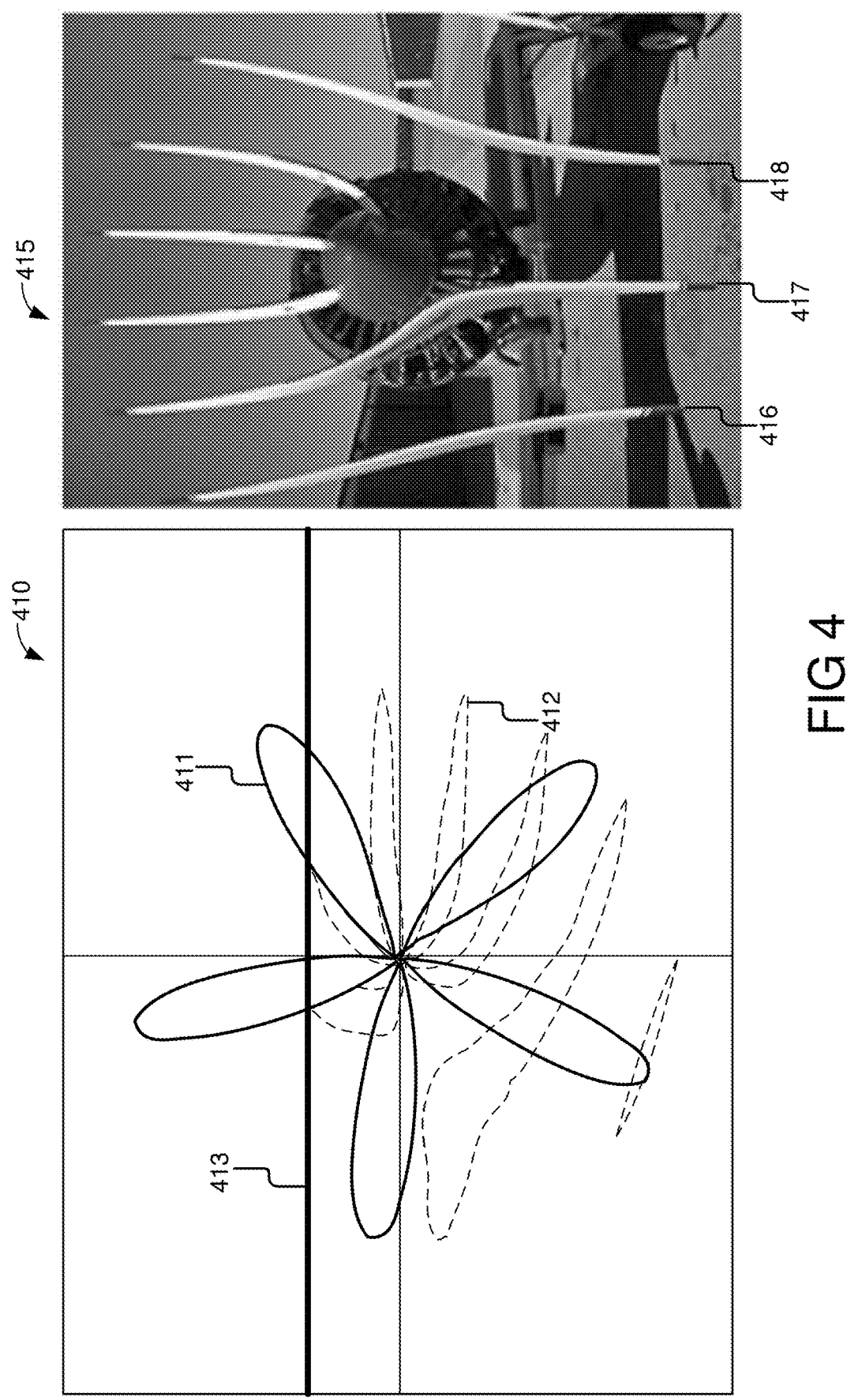
FIG. 4 is a block diagram that illustrates how rolling shutter on a camera results in artifacts in an image according to some embodiments described herein.

FIG. 4 is a block diagram 400 that illustrates how rolling shutter on a camera results in artifacts in an image according to some embodiments described herein. In the first box 410, the solid curved lines 411 represent the wings of an airplane propeller, the dashed lines 412 represent the motion captured during the rolling shutter, and the solid bolded horizontal line 413 represents the position of the rolling shutter.

The second box 415 includes the resulting image of the airplane propeller captured by the rolling shutter. The second box 415 illustrates several artifacts 416, 417, 418 where the wings are not attached to the propeller.

The issue of synchronization becomes even more pronounced when there are multiple cameras capturing images of an object. For example, 70-100 cameras may be used to generate a 3D volumetric model and if some of the cameras are misaligned, the artifacts are particularly pronounced. In some embodiments, the camera module 202 solves this issue by ensuring that the cameras 120 all have a colinear orientation. In some embodiments, the camera module 202 further ensures that the cameras 120 have positions, angles, and orientations that are aligned for all cameras 120 in a set of cameras 120. As a result of ensuring alignment of the cameras 120, the cameras 120 scan the same line number at the same time, thereby reducing artifacts in the 3D volumetric model.

In some embodiments, the camera module 202 determines whether each of the cameras 120 in the set of cameras 120 captures images that are colinear. For example, the camera module 202 may determine whether a camera 120 has one or more of a correct position, angle, or orientation as compared to the other cameras 120. In some embodiments, the camera module 202 determines that the orientation is the same for each of the cameras 120. For example, the camera module 202 determines that all the cameras 120 are using a landscape orientation or a portrait orientation. In some embodiments, the camera module 202 also determines that the position and/or angle of the cameras 120 are correct. If one or more cameras 120 need a correction of the position, angle, or orientation, in some embodiments, the camera module 202 instructs the user interface module 206 to generate a user interface that instructs a user 125 on how to correct the camera 120.

Figure 5:
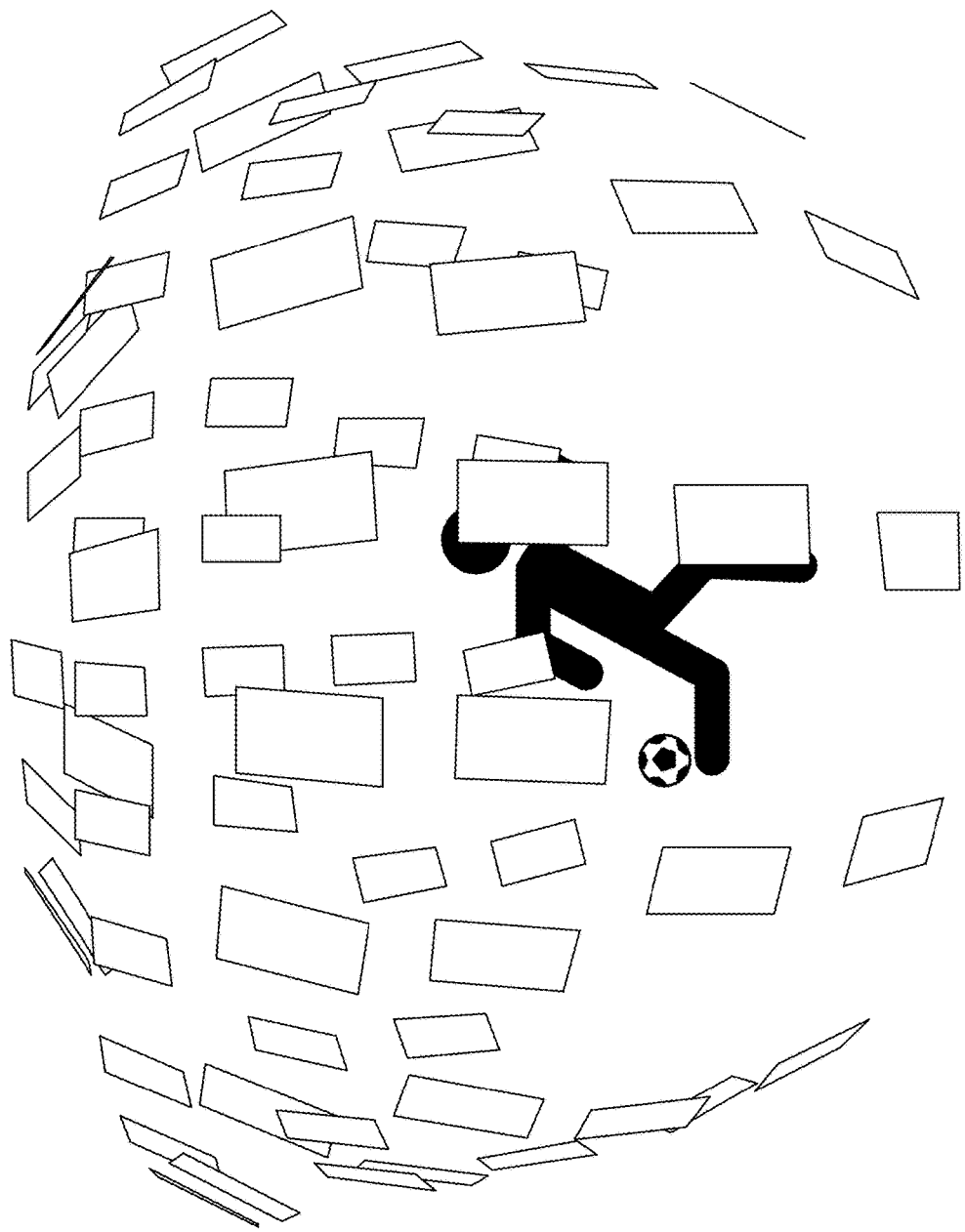
FIG. 5 is a block diagram that illustrates a set of cameras that capture images of objects where the cameras are positioned in a portrait orientation according to some embodiments described herein.

Turning to FIG. 5, a block diagram 500 illustrates a set of cameras 120 that capture images of objects where the cameras are positioned in a portrait orientation. The objects are a person kicking a soccer ball. Because the person is in motion, the set of cameras 120 are arranged in the same portrait orientation in order to capture the images.

FIG. 6 is a block diagram 600 that illustrates a set of cameras 120 that capture images of an object where the cameras are positioned in a landscape orientation. This configuration is referred to as a landscape cylinder. The cameras 120 may be arranged in different levels where the images from each level are processed independently to maintain synchronization.

FIG. 7 is a block diagram 700 that illustrates a set of cameras 120 that are positioned in a second layer in a landscape orientation. The person is illustrated as only having half of a body because the illustrated part of the person corresponds to the area being captured by the cameras arranged at the L2 level.

Figure 8:
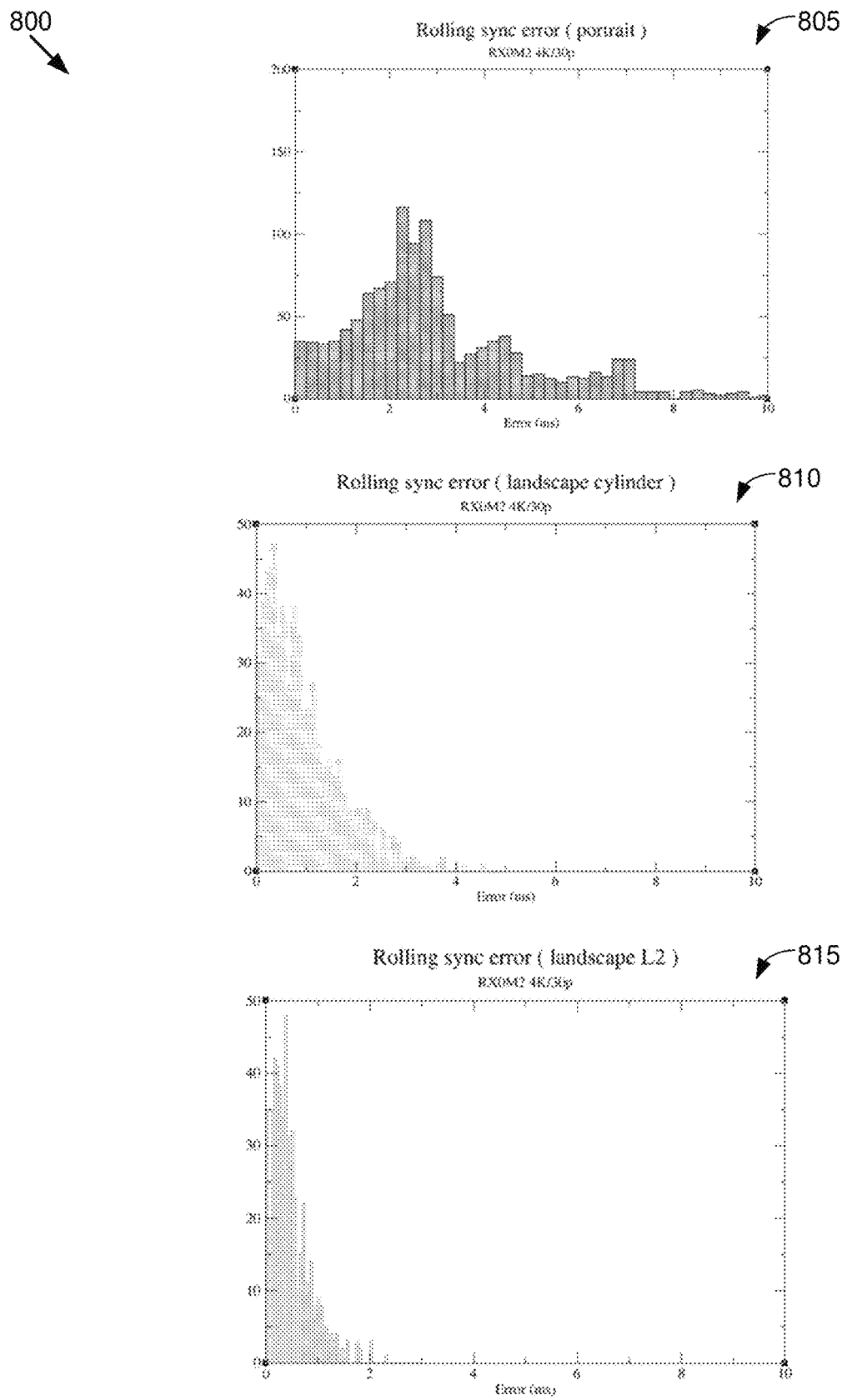
FIG. 8 is a block diagram that illustrates rolling sync error of different orientations as a function of time according to some embodiments described herein.

FIG. 8 is a block diagram 800 that illustrates rolling sync error of different orientations as a function of time. The block diagram 800 includes a first graph 805 of the rolling sync error probability distribution when the cameras 120 are arranged in portrait view as a function of time in milliseconds, a second graph 810 of the rolling sync error probability distribution when the cameras 120 are arranged in a landscape cylinder as a function of time in milliseconds, and a third graph 815 of the rolling sync error probability distribution when the cameras 120 are in an L2 configuration of the landscape orientation as a function of time in milliseconds. The graphs reflect the sync difference between the lines of the rolling shutter at exactly the same point for each of the cameras 120.

The graphs measure the error in the first 10 ms of the rolling shutter and for all three cases, the greatest incidences of error occur before 3.5 ms. For the first graph 805 of the errors that occur in portrait orientation, the peak of the errors occur around 2.5 ms. For the second graph 810 of the errors that occur for all the cameras 120 in the landscape orientation, the peak of the errors occur around 0.5 ms. For the third graph 815 of the errors that occur for the cameras 120 in the level L2 of the landscape orientation, the peak of the errors occur around 0.75 ms. The third graph 815 illustrates that by processing different landscape orientation levels independently, the rolling sync error is minimized. The errors are greater in the second graph 810 because processing all the levels at the same time destroys the synchronization and creates an out-of-phase synchronization error because movement will be different with different levels of the body.

The 3D modeling module 204 generates a 3D level for each level of cameras 120. In some embodiments, the 3D modeling module 204 includes a set of instructions executable by the processor 235 to generate the 3D levels. In some embodiments, the 3D modeling module 204 is stored in the memory 237 of the computing device 200 and can be accessible and executable by the processor 235.

In some embodiments, the 3D modeling module 204 generates the 3D levels by generating a rough 3D mesh in levels or 3D pointclouds for each level of one or more objects. In some embodiments, the 3D modeling module 204 employs third-party software to calculate the rough 3D mesh or the 3D pointclouds, such as Metashape, RealityCapture, or COLMAP.

In some embodiments, the 3D modeling module 204 receives a subset of images that correspond to a level and the position and orientation of each corresponding camera 120. For example, the landscape cylinder in FIG. 6 has six different levels. The 3D modeling module 204 performs feature extraction on the subset of the images. For example, the subset of images may be of a person and the 3D modeling module 204 identifies features that include a location of the person's nose, distance to the person's eyes, location of the person's mouth, etc.

In some embodiments, the feature extraction is performed by a Scale-Invariant Feature Transform (SIFT) algorithm. The SIFT algorithm identifies keypoints in a first image that are compared to keypoints in a second image irrespective of rotation, translation, and scale. In some embodiments, the SIFT algorithm computes scale-space maxima of a Laplacian representation using differences of Gaussians where the maxima correspond to the keypoints. In some embodiments, the 3D modeling module applies a filter to reduce the number of keypoints in an image to reduce the computational demand during feature extraction.

In some embodiments, the 3D modeling module 204 matches images from a subset of the images based on the images capturing the same areas of the object. In some embodiments, the 3D modeling module 204 provides the keypoints to a vocabulary tree, which outputs feature descriptors as leaves of the vocabulary tree.

The 3D modeling module 204 matches extracted features between the matched images. For example, the 3D modeling module 204 identifies the overlap of keypoints between two images and repeats the matching until the subset of images that correspond to a level are matched.

In some embodiments, the 3D modeling module 204 performs photometric matches between a set of the feature descriptors from two input images. From each feature in the first image, the 3D modeling module 204 obtains a list of candidate features in the second image and selects the two closest descriptors. The 3D modeling module 204 may use algorithms such as approximate nearest neighbor or cascading hashing to perform the matching. The 3D modeling module 204 may use the positions of the matching extracted features to make a geometric filtering using epipolar geometry in an outlier detection framework, such as RANdom Sample Consensus (RANSAC). The 3D modeling module 204 may select a small set of feature correspondences and computes a fundamental matrix, checks the number of features that validates the model, and iterates through the RANSAC framework. The 3D modeling module may perform the photometric matches for all of the input images until they have all been accounted for.

The 3D modeling module 204 generates a 3D pointcloud for each level based on the position and orientation of corresponding cameras 120 and matched extracted features.

In some embodiments, the 3D modeling module 204 generates the 3D pointcloud for each level by fusing the feature matches between image pairs into tracks where each track represents a point in space that is visible from multiple cameras 120. The 3D modeling module 204 removes incoherent tracks during the fusion. In some embodiments, the 3D modeling module 204 selects an initial image pair that maximizes a number of matches and the repartition of corresponding features in each image.

In some embodiments, the 3D modeling module 204 next computes a matrix between the selected image pair and uses the matrix along with pose information to triangulate corresponding two-dimensional features in the images into 3D points for the 3D pointcloud. Next, the 3D modeling module 204 selects additional images that have overlap with the extracted features that are part of the existing 3D pointcloud and stitches the additional images to the 3D pointcloud. For example, the 3D modeling module 204 uses a Perspective-n-Point algorithm (PnP) in a RANSAC framework to find a pose from the images that maximizes a validation of the extracted features. The process continues, along with removal of invalid 3D points, until there are no more selected image pairs available.

The 3D modeling module 204 receives a 3D pointcloud for each level and merges the 3D pointclouds to form a three-dimensional volumetric model of the object. In some embodiments, the 3D modeling module 204 merges the 3D pointclouds by identifying overlap between the 3D pointclouds for each level and stitches the 3D pointclouds together based on the overlap. Because each level of the 3D pointcloud is generated independently, the method advantageously reduces the rolling shutter errors.

Figure 9:
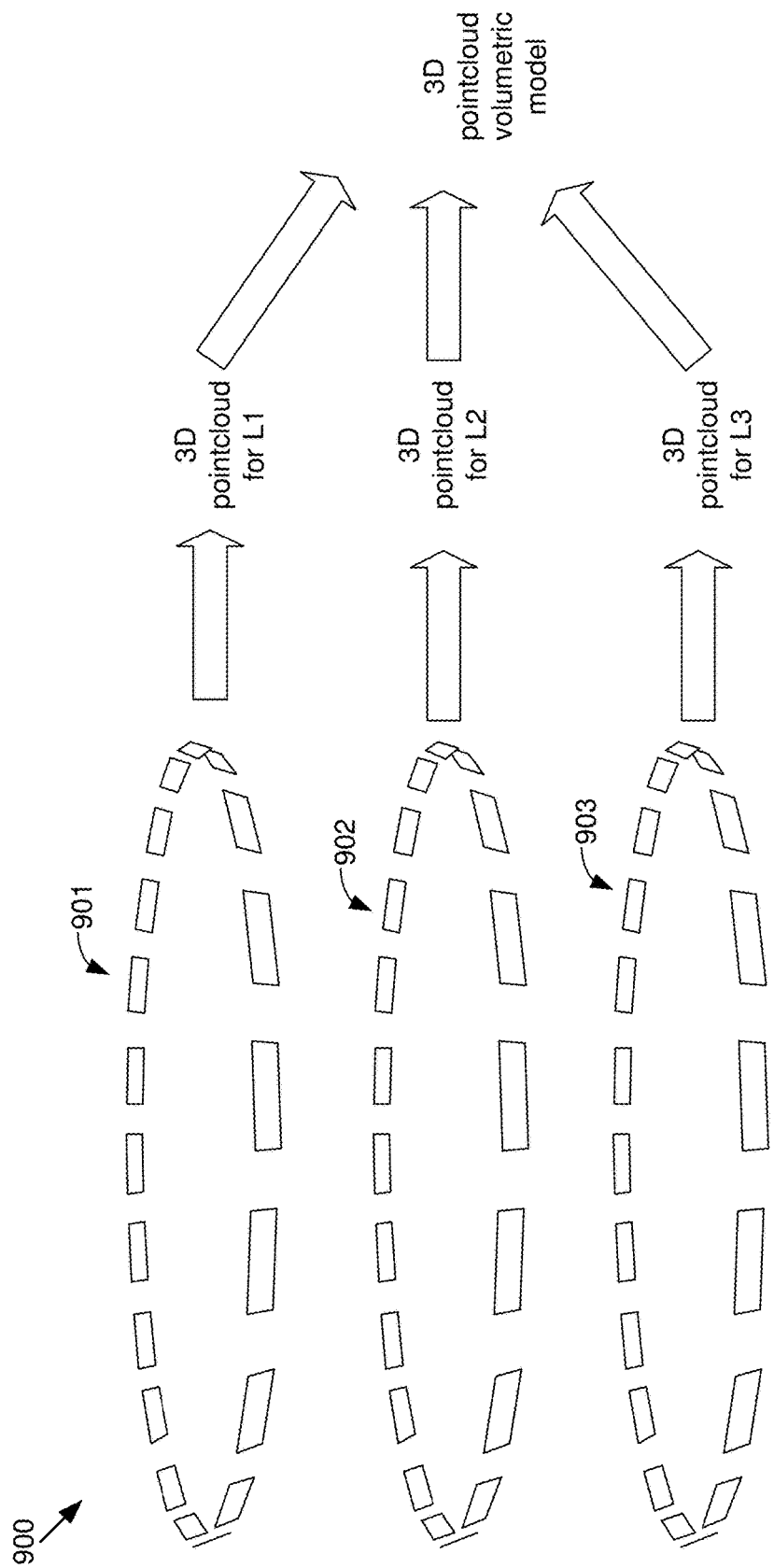
FIG. 9 is a block diagram that illustrates multiple levels of a set of cameras in landscape orientation that capture images that are used to form a three-dimensional (3D) volumetric model of an object according to some embodiments described herein.

The multiple levels of the 3D pointclouds may be horizontal levels or vertical levels. Turning to FIG. 9, a block diagram 900 illustrates three levels of a set of cameras in landscape orientation that capture images that are used to form a three-dimensional (3D) volumetric model of an object. Specifically, the L1 901, the L2 902, and the L3 903 levels of the set of cameras form a cylinder around an object and provide images that are used by the 3D modeling module 204 to generate a 3D pointcloud for L1, a 3D pointcloud for L2, and a 3D pointcloud for L3. The 3D modeling module 204 merges the three levels of pointclouds to generate a 3D pointcloud volumetric model.

Figure 10:
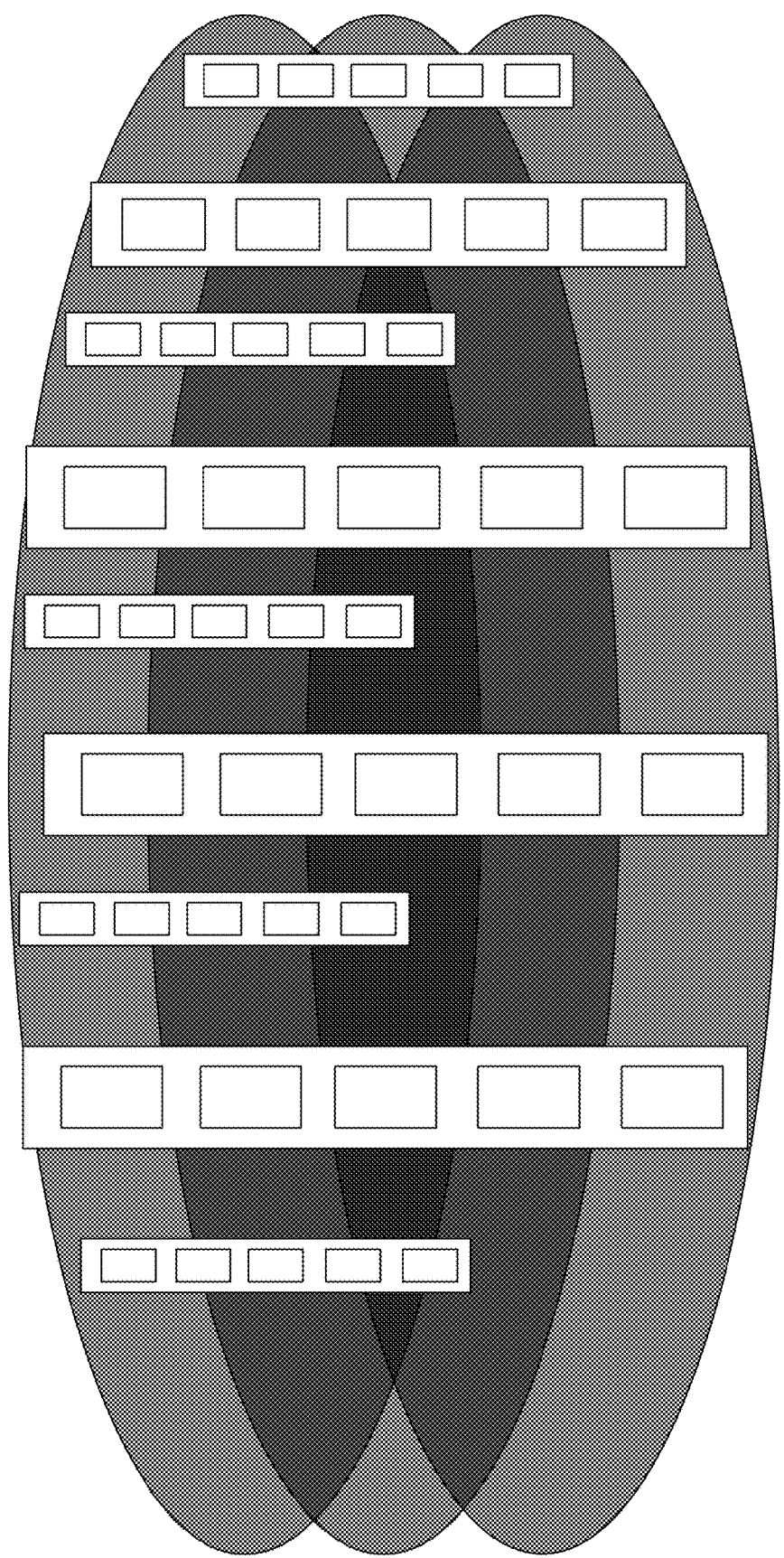
FIG. 10 is a block diagram that illustrates multiple levels of a set of cameras in portrait orientation that capture images that are used to form a 3D volumetric model of an object according to some embodiments described herein.

FIG. 10 is a block diagram 1000 that illustrates multiple levels of a set of cameras in portrait orientation that capture images that are used to form a 3D volumetric model of an object. The levels of the set of cameras 120 form columns around the object. In this example, there are many more levels of cameras when the cameras are in the portrait orientation than when the cameras 120 are in the landscape orientation. Similar to how the 3D pointcloud volumetric model is generated from images in landscape mode, the 3D modeling module 204 generates a 3D pointcloud for each level independently and then merges the 3D pointclouds to form the 3D pointcloud volumetric model.

The user interface module 206 generates a user interface. In some embodiments, the user interface module 206 includes a set of instructions executable by the processor 235 to generate the user interface. In some embodiments, the user interface module 206 is stored in the memory 237 of the computing device 200 and can be accessible and executable by the processor 235.

In some embodiments, the user interface module 206 receives instructions from the camera module 202 to display a user interface that provides instructions for how to position a camera 120a from the set of cameras 120. In some embodiments, the instructions are based on achieving a particular position and a particular orientation of the camera 120a.

Figure 11:
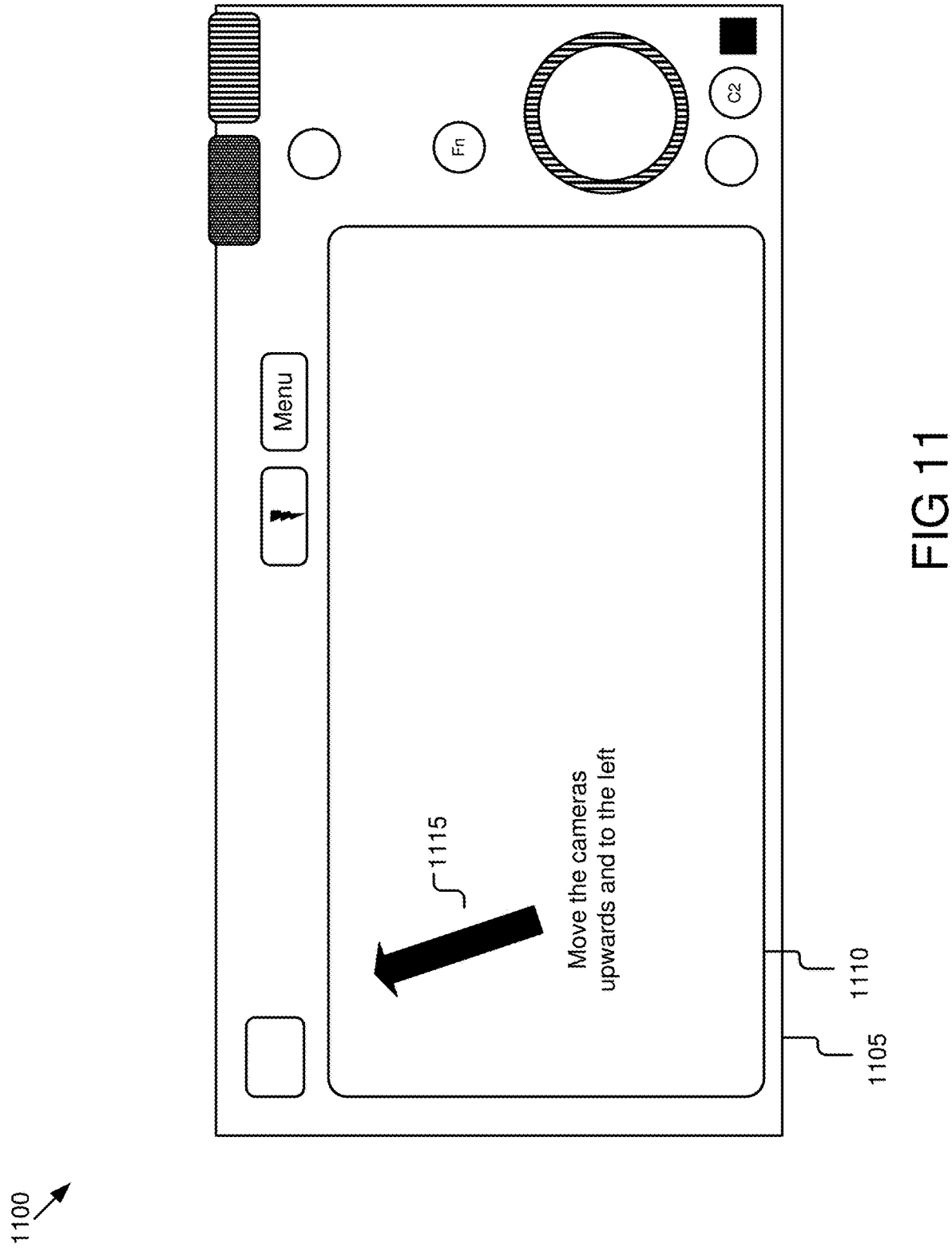
FIG. 11 is a block diagram that illustrates a user interface that guides a user to change a position of a camera according to some embodiments described herein.

For example, FIG. 11 is a block diagram 1100 that illustrates a camera 1105 with a user interface 1110 that guides a user to change a position of the camera 1105. In this example, the user interface 1110 includes an array for moving the camera 1105 up and to the left. In some embodiments, the length of the arrow 1115 indicates how much to move the camera 1105. As a user moves the camera 1105, the user interface 1110 updates to display a shorter arrow 1115 until the camera 1105 is at the desired location. In some embodiments, once the camera 1105 is at the desired location, the user interface 1110 updates to display a confirmation that the camera 11105 is at the desired location, such as by displaying a checkmark or text.

Although the user interface in FIG. 11 is illustrates as being on a camera 120, other examples of user interfaces are possible. For example, the user device 115 may display a user interface with instructions on how to move one or more of the cameras 120a in the set of cameras 120.

Example Method 1200

Figure 12:
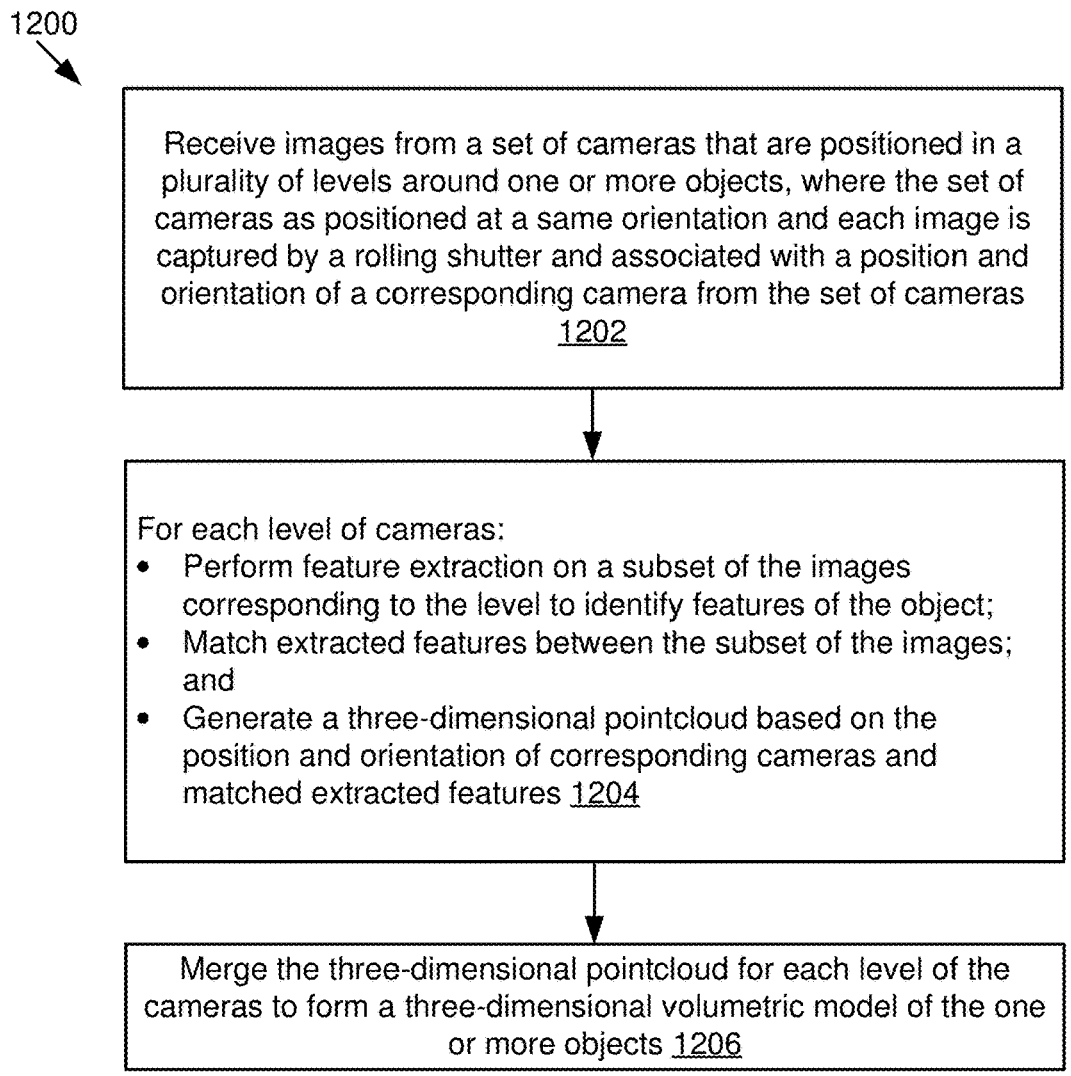
FIG. 12 illustrates a flowchart for generating a 3D volumetric model of an object according to some embodiments described herein.

FIG. 12 illustrates a flowchart 1200 for generating a 3D volumetric model of an object according to some embodiments described herein. The method illustrated in flowchart 1200 may be performed by the computing device 200 in FIG. 2. For example, the computing device 200 may be the server 101 or the user device 115 illustrated in FIG. 1. The computing device 200 includes a camera application 103 that implements the steps described below.

The method 1200 may start with block 1202. At block 1202, images are received from a set of cameras that are positioned in a plurality of levels around one or more objects, where the set of cameras are positioned at a same orientation and each image is captured by a rolling shutter and associated with a position and orientation of a corresponding camera from the set of cameras. Block 1202 may be followed by block 1204.

At block 1204, for each level of cameras: feature extraction is performed on a subset of the images corresponding to the level to identify features of the object; match extracted features between the subset of the images; and generate a 3D pointcloud based on the position and orientation of corresponding cameras and matched extracted features. Block 1204 may be followed by block 1206.

At block 1206, the three-dimensional pointclouds for each level of the cameras are merged to form a three-dimensional volumetric model of the one or more objects.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A computer-implemented method comprising:
   receiving images from a set of cameras that are positioned in a plurality of levels around one or more objects, wherein the set of cameras are positioned at a same orientation and each image is captured by a rolling shutter and associated with a position and orientation of a corresponding camera from the set of cameras;
   for each level of cameras:

performing feature extraction on a subset of the images corresponding to the level to identify features of one or more objects;

matching extracted features between the subset of the images; and generating a three-dimensional pointcloud based on the position and orientation of corresponding cameras and matched extracted features; and merging the three-dimensional pointcloud for each level of the cameras to form a three-dimensional volumetric model of one or more objects.

2. The method of claim 1, wherein the same orientation is a landscape orientation and each of the levels forms a cylinder around the one or more objects.

3. The method of claim 1, wherein the same orientation is a portrait orientation and each of the levels forms a column.

4. The method of claim 1, wherein one or more of the cameras in the set of cameras are part of a drone.

5. The method of claim 1, further comprising:

determining that a camera in the set of cameras is not positioned or orientated to capture images that are colinear with the subset of the images corresponding to the level.

6. The method of claim 1, further comprising:

generating graphical data for displaying a user interface that provides instructions for how to position a camera from the set of cameras.

7. The method of claim 6, wherein the instructions are based on achieving a particular position and a particular orientation of the camera.

8. An apparatus comprising:

one or more processors; and logic encoded in one or more non-transitory media for execution by the one or more processors and when executed operable to:

receive images from a set of cameras that are positioned in a plurality of levels around one or more objects, wherein the set of cameras are positioned at a same orientation and each image is captured by a rolling shutter and associated with a position and orientation of a corresponding camera from the set of cameras;

for each level of cameras:

perform feature extraction on a subset of the images corresponding to the level to identify features of one or more objects;

match extracted features between the subset of the images; and generate a three-dimensional pointcloud based on the position and orientation of corresponding cameras and matched extracted features; and merge the three-dimensional pointcloud for each level of the cameras to form a three-dimensional volumetric model of one or more objects.

9. The apparatus of claim 8, wherein the same orientation is a landscape orientation and each of the levels forms a cylinder around the one or more objects.

10. The apparatus of claim 8, wherein the same orientation is a portrait orientation and each of the levels forms a column.

11. The apparatus of claim 8, wherein one or more of the cameras in the set of cameras are part of a drone.

12. The apparatus of claim 8, wherein the logic when executed is further operable to:

determine that a camera in the set of cameras is not positioned or orientated to capture images that are colinear with the subset of the images corresponding to the level.

13. The apparatus of claim 8, wherein the logic when executed is further operable to:

generate graphical data for displaying a user interface that provides instructions for how to position a camera from the set of cameras.

14. The apparatus of claim 13, wherein the instructions are based on achieving a particular position and a particular orientation of the camera.

15. Software encoded in one or more computer-readable media for execution by the one or more processors and when executed is operable to:

receive images from a set of cameras that are positioned in a plurality of levels around one or more objects, wherein the set of cameras are positioned at a same orientation and each image is captured by a rolling shutter and associated with a position and orientation of a corresponding camera from the set of cameras;

for each level of cameras:

perform feature extraction on a subset of the images corresponding to the level to identify features of one or more objects;

match extracted features between the subset of the images; and generate a three-dimensional pointcloud based on the position and orientation of corresponding cameras and matched extracted features; and merge the three-dimensional pointcloud for each level of the cameras to form a three-dimensional volumetric model of one or more objects.

16. The software of claim 15, wherein the same orientation is a landscape orientation and each of the levels forms a cylinder around the one or more objects.

17. The software of claim 15, wherein the same orientation is a portrait orientation and each of the levels forms a column.

18. The software of claim 15, wherein one or more of the cameras in the set of cameras are part of a drone.

19. The software of claim 15, wherein the one or more processors are further operable to:

determine that a camera in the set of cameras is not positioned or orientated to capture images that are colinear with the subset of the images corresponding to the level.

20. The software of claim 15, wherein the one or more processors are further operable to:

generate graphical data for displaying a user interface that provides instructions for how to position a camera from the set of cameras.

* * * * *